United States Patent
Liu et al.

(10) Patent No.: US 11,464,047 B2
(45) Date of Patent: Oct. 4, 2022

(54) TRS BURST TRANSMISSION METHOD AND APPARATUS

(71) Applicant: HUAWEI TECHNOLOGIES CO., LTD., Shenzhen (CN)

(72) Inventors: Yang Liu, Shenzhen (CN); Jun Zhu, Shenzhen (CN); Qiong Jia, Shanghai (CN); Jiayin Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 40 days.

(21) Appl. No.: 16/906,543

(22) Filed: Jun. 19, 2020

(65) Prior Publication Data

US 2020/0322990 A1    Oct. 8, 2020

Related U.S. Application Data

(63) Continuation of application No. PCT/CN2018/122856, filed on Dec. 21, 2018.

(30) Foreign Application Priority Data

Dec. 29, 2017 (CN) .......................... 201711472881.7

(51) Int. Cl.
*H04W 74/08* (2009.01)
*H04L 5/00* (2006.01)
(Continued)

(52) U.S. Cl.
CPC ....... *H04W 74/0808* (2013.01); *H04L 5/0051* (2013.01); *H04L 27/2613* (2013.01); *H04W 72/0446* (2013.01)

(58) Field of Classification Search
CPC .......... H04W 74/0808; H04W 72/0446; H04L 5/0051; H04L 27/2613; H04L 5/0094; H04L 5/0048; H04J 3/06; H04J 3/0635
See application file for complete search history.

(56) References Cited

U.S. PATENT DOCUMENTS

2013/0114535 A1* 5/2013 Ng .................... H04L 5/0005
370/329
2015/0030037 A1 1/2015 Ahn et al.
(Continued)

FOREIGN PATENT DOCUMENTS

CN 103391610 A 11/2013
CN 104038311 A 9/2014
(Continued)

OTHER PUBLICATIONS

Ericsson : On time and frequency tracking of the channel, 3GPP TSG-RAN WG1 #90, R1-1714317, Aug. 2017, (Year: 2017).*
(Continued)

*Primary Examiner* — Rina C Pancholi
(74) *Attorney, Agent, or Firm* — Stein IP, LLC

(57) ABSTRACT

A tracking reference signal (TRS) burst transmission method and apparatus wherein a transmit end determines to send a first TRS burst in the first slot in a maximum channel occupancy time (MCOT), that is, the TRS burst is sent at a start moment of the MCOT, so that a receive end can obtain precise time-frequency synchronization as soon as possible. In addition, when a length of a first MCOT is greater than Y slots, in addition to sending the first TRS burst in the first slot in the MCOT, it is further determined to send a second TRS burst in a slot that is in the first MCOT and whose distance to a start slot of a previous TRS burst is Y slots, to improve effectiveness of the time-frequency synchronization and further improve the reliability of receiving the data at the receive end.

20 Claims, 12 Drawing Sheets

(51) Int. Cl.
*H04L 27/26* (2006.01)
*H04W 72/04* (2009.01)

(56) References Cited

U.S. PATENT DOCUMENTS

| | | | |
|---|---|---|---|
| 2015/0036653 | A1 | 2/2015 | Kim et al. |
| 2015/0341803 | A1* | 11/2015 | Kim .................. H04W 74/0833 370/252 |
| 2016/0360437 | A1* | 12/2016 | Larsson ................ H04L 5/0048 |
| 2018/0310193 | A1* | 10/2018 | Bhorkar ............... H04B 7/0626 |
| 2019/0052443 | A1* | 2/2019 | Cheng .................. H04L 5/0007 |

FOREIGN PATENT DOCUMENTS

| | | |
|---|---|---|
| CN | 104144504 A | 11/2014 |
| CN | 104937866 A | 9/2015 |
| CN | 106685611 A | 5/2017 |
| CN | 106851839 A | 6/2017 |
| CN | 107005999 A | 8/2017 |
| CN | 107370589 A | 11/2017 |

OTHER PUBLICATIONS

Huawei et al.,"Reference Signal for fine time and frequency tracking",3GPP TSG RAN WGI Meeting #90 R1-1712236, Prague, Czech Republic, Aug. 21-25, 2017,total 6 pages.
Qualcomm Incorporated,"Further analysis on fine time/frequency tracking RS design",3GPP TSG RAN WG1 NR Ad-Hoc#2 R1-1711175,Jun. 27-30, 2017,total 25 pages.
Ericsson,"On time and frequency tracking of the channel",3GPP TSG-RAN WG1#90 R1-1714317,Prague, Czechia, Aug. 21-25, 2017,total 41 pages.

* cited by examiner

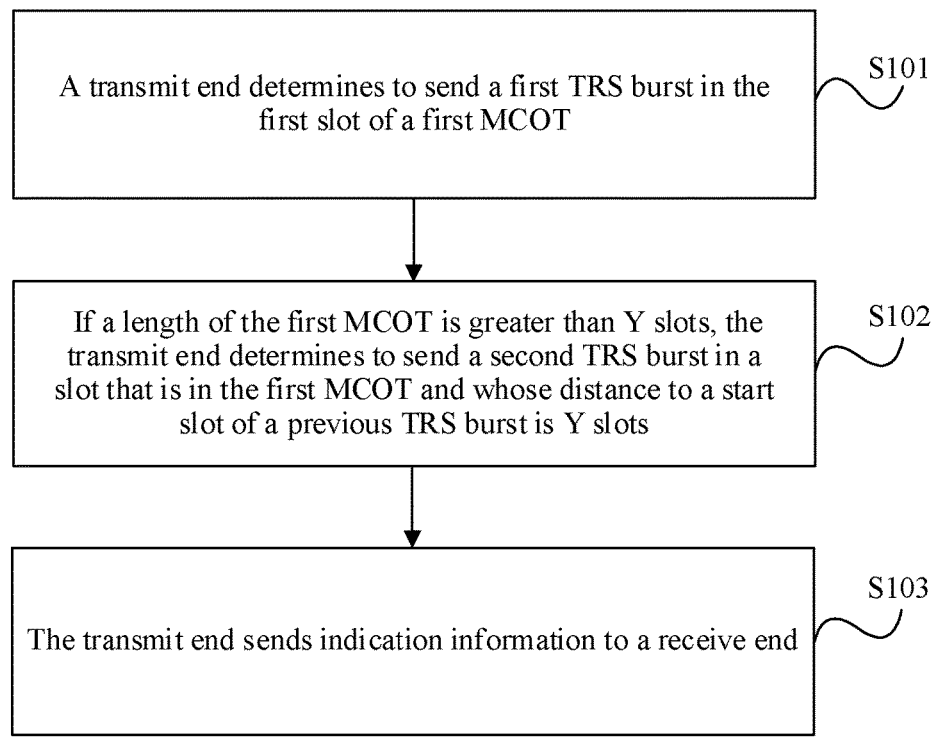
FIG. 1
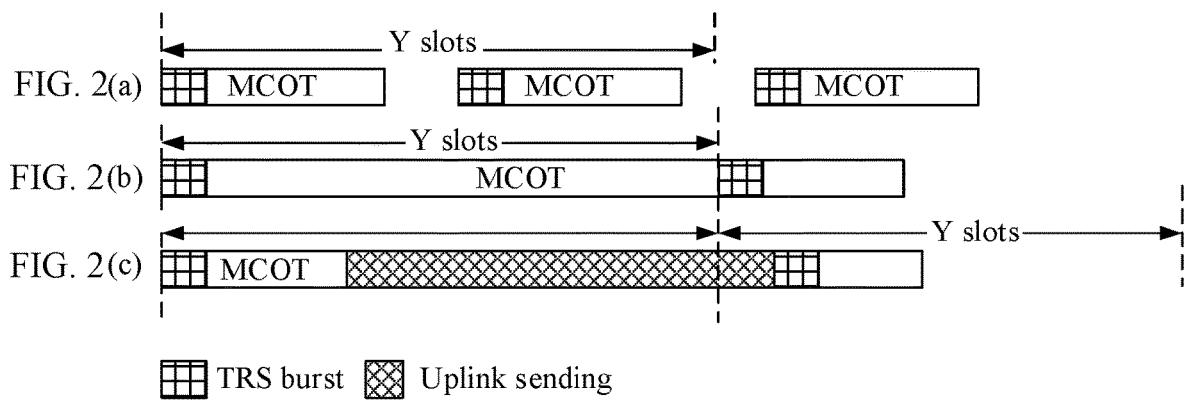

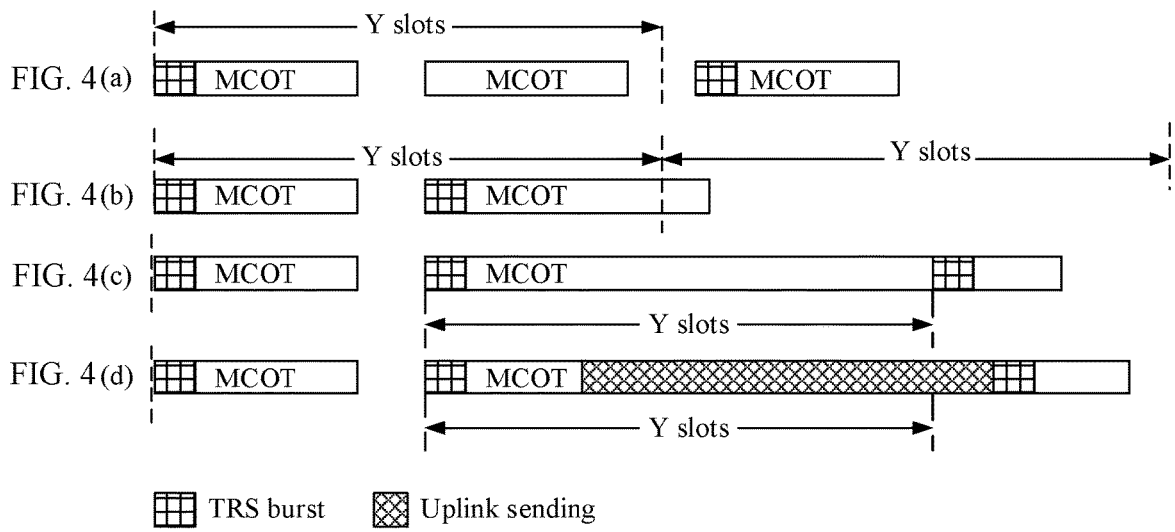
FIG. 4(a)
FIG. 4(b)
FIG. 4(c)
FIG. 4(d)
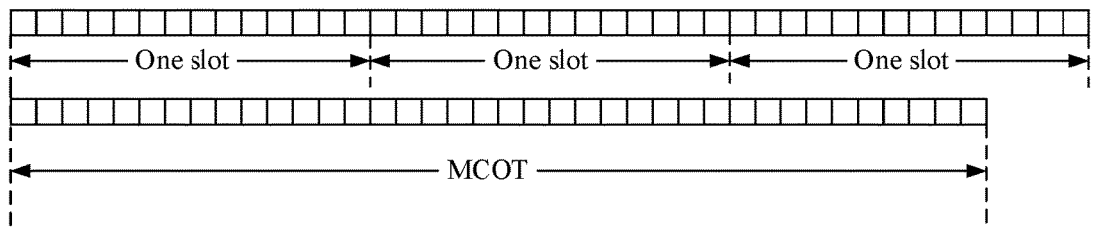
FIG. 5
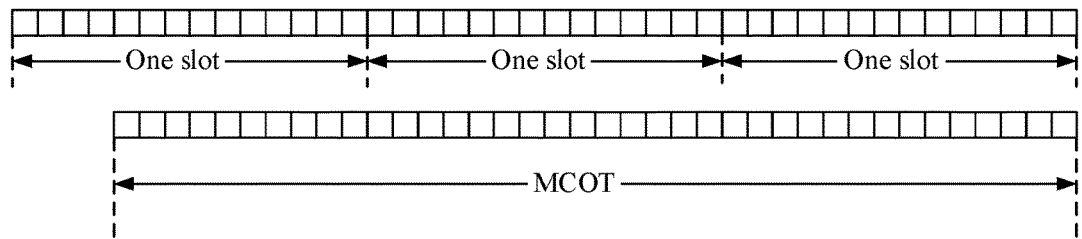
FIG. 6

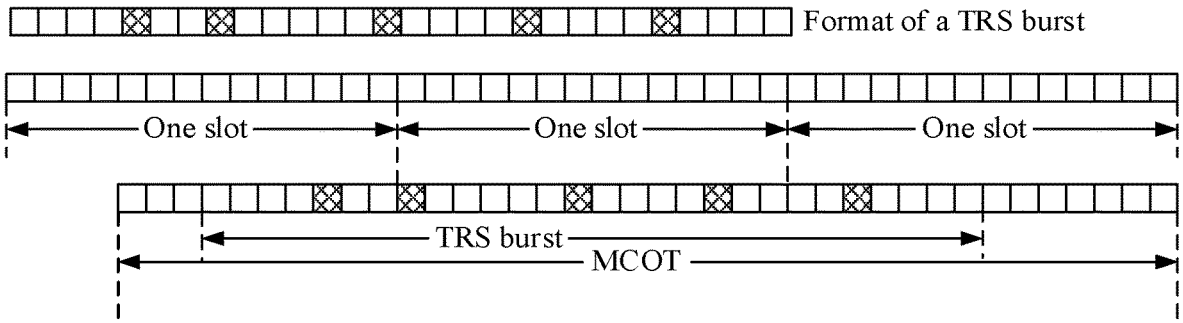
FIG. 8c
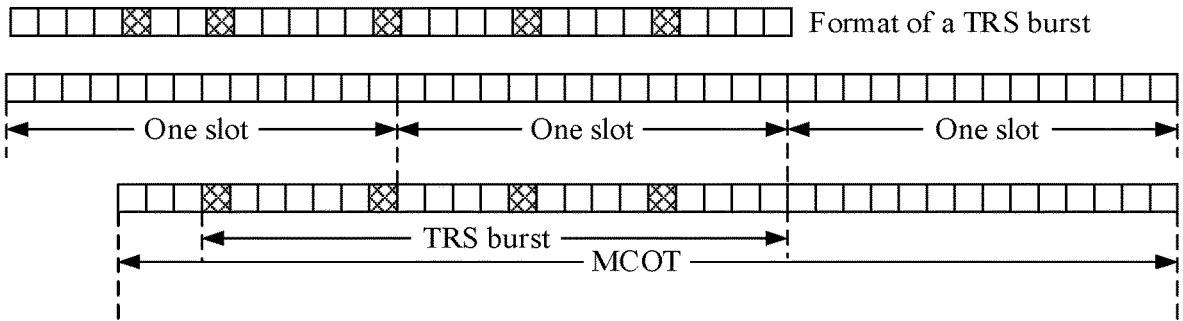
FIG. 8d
A transmit end determines to send a TRS burst in the first slot that is in a first MCOT and whose distance to a start slot of a previous TRS burst is greater than or equal to Y slots — S901
The transmit end sends indication information to a receive end — S902
FIG. 9

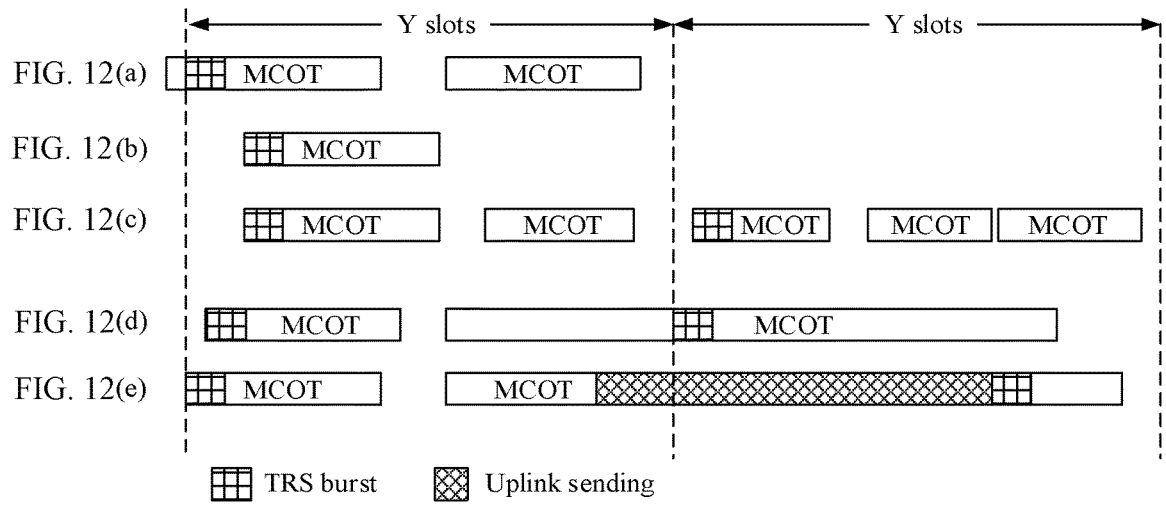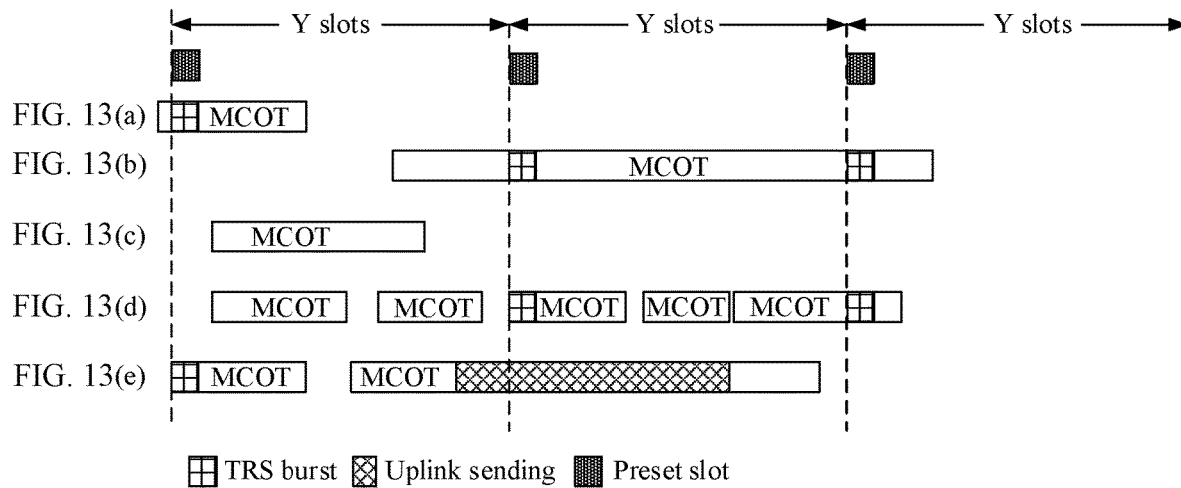

TRS BURST TRANSMISSION METHOD AND APPARATUS

CROSS-REFERENCE TO RELATED APPLICATIONS

This application is a continuation of International Application No. PCT/CN2018/122856, filed on Dec. 21, 2018, which claims priority to Chinese Patent Application No. 201711472881.7, filed on Dec. 29, 2017. The disclosures of the aforementioned applications are hereby incorporated by reference in their entireties.

TECHNICAL FIELD

Aspects of this application relate to the field of communications technologies, and in particular, to a tracking reference signal (TRS) burst transmission method and apparatus.

BACKGROUND

A TRS is a new reference signal in a new radio unlicensed (NRU) frequency band system. A main function of the TRS is to implement precise time-domain synchronization and frequency-domain synchronization, for example, implement time-domain offset tracking, frequency-domain offset tracking, time-domain extension tracking, and frequency-domain extension tracking.

The TRS is a signal that is not sent continuously. A TRS burst includes X consecutive slots, X is an integer greater than or equal to 1, and a TRS symbol sent on a predetermined time-frequency resource exists in a TRS burst. Therefore, precise synchronization can be achieved.

However, currently, there is no TRS burst transmission method in the NRU system.

SUMMARY

Aspects of this application provide a TRS burst transmission method and apparatus, to resolve a problem that there is no TRS burst transmission method in a current NRU system.

A first aspect of this application provides a TRS burst transmission method. The method includes: A transmit end determines to send a first TRS burst in the first slot in a maximum channel occupancy time (MCOT), that is, the TRS burst is sent at a start moment of the MCOT, so that a receive end can obtain precise time-frequency synchronization as soon as possible, to facilitate decoding by the receive end and improve reliability of receiving data at the receive end. In addition, when a length of a first MCOT is greater than Y slots, in addition to sending the first TRS burst in the first slot in the MCOT, the transmit end further determines to send a second TRS burst in a slot that is in the first MCOT and whose distance to a start slot of a previous TRS burst is Y slots, to further improve effectiveness of the time-frequency synchronization and further improve the reliability of receiving the data at the receive end. Because the transmit end fixedly sends the first TRS burst in the first slot in each MCOT, the receive end may directly parse the first TRS burst in the first slot in each MCOT, and the transmit end does not need to indicate, to the receive end, the slot for sending the first TRS burst, and only needs to indicate, to the receive end, the slot for sending the second TRS, thereby reducing signaling overheads.

Optionally, before the transmit end determines to send the second TRS burst in the slot that is in the first MCOT and whose distance to the start slot of the previous TRS burst is Y slots, the method further includes: The transmit end determines that the slot that is in the first MCOT and whose distance to the start slot of the previous TRS burst is Y slots is not in an uplink sending state.

Optionally, the method further includes: If the transmit end determines that the slot that is in the first MCOT and whose distance to the start slot of the previous TRS burst is Y slots is in the uplink sending state, the transmit end determines to send the second TRS burst in the first slot after the uplink sending state ends.

Optionally, before the transmit end determines to send the second TRS burst in the first slot after the uplink sending state ends, the method further includes: the transmit end determines that a remaining slot in the first MCOT after the uplink sending state ends is greater than or equal to a length of the TRS burst.

Optionally, before the transmit end determines to send the first TRS burst in the first slot in the first MCOT, the method further includes:

the transmit end determines that a distance between an end slot in the first MCOT and a start slot of the last TRS burst of a previous MCOT is greater than Y slots.

Optionally, that the transmit end determines to send the first TRS burst in the first slot in the first MCOT includes:

the transmit end determines to send the first TRS burst in the first complete slot in the first MCOT.

Optionally, that the transmit end determines to send the first TRS burst in the first slot in the first MCOT includes:

the transmit end determines to send the first TRS burst in the first symbol in the first MCOT.

Optionally, that the transmit end sends indication information to a receive end includes:

the transmit end sends the indication information to the receive end on a preset resource, where the indication information is used to indicate a slot of one TRS burst, and each piece of the indication information includes a start slot of one TRS burst.

Optionally, that the transmit end sends the indication information to the receive end includes:

the transmit end sends the indication information to the receive end on the preset resource, where the indication information is used to indicate slots of a plurality of TRS bursts, and the indication information includes a start slot of the first TRS burst and an offset between a start slot of another remaining TRS burst and the start slot of the first TRS burst.

A second aspect of this application provides a TRS burst transmission method. The method includes:

a transmit end determines to send a TRS burst in the first slot that is in a first MCOT and whose distance to a start slot of a previous TRS burst is greater than or equal to Y slots; and the transmit end sends indication information to the receive end, where the indication information is used to indicate the slot for sending the TRS burst, so that a quantity of times of sending the TRS burst is reduced, and overheads of sending the TRS burst are reduced.

Optionally, when the first slot that is in the first MCOT and whose distance to the start slot of the previous TRS burst is greater than or equal to Y slots is not in an uplink sending state, the transmit end determines to send the TRS burst in a slot that is in the first MCOT and whose distance to the start slot of the previous TRS burst is Y slots, to improve reliability of receiving data by the receive end. If the first slot that is in the first MCOT and whose distance to the start slot of the previous TRS burst is greater than or equal to Y slots is in the uplink sending state, the transmit ends determines to send the TRS burst in the first slot after the uplink sending state ends, to send the TRS burst at an earliest possible moment. This further improves reliability of receiving data by the receive end.

Optionally, before the transmit end determines to send the TRS burst in the first slot after the uplink sending state ends, the method further includes:

The transmit end determines that a remaining slot in the first MCOT after the uplink sending state ends is greater than or equal to a length of the TRS burst.

A third aspect of this application provides a TRS burst transmission method. The method includes:

a time axis is divided into consecutive time periods, and a first TRS burst is sent in the first slot in a first MCOT in each time period; and a transmit end sends indication information to a receive end, where the indication information is used to indicate a slot for sending the first TRS burst, so that a TRS burst is sent at an earliest possible moment in each time period, thereby improving reliability of receiving data by the receive end.

Optionally, before the transmit end determines a first MCOT in a first time period and sends the first TRS burst in the first slot in the first time period, the method further includes:

the transmit end determines that the first MCOT in the first time period is not in an uplink sending state in the first slot in the first time period.

Optionally, the method further includes:

if the first MCOT in the first time period is in the uplink sending state in the first slot in the first time period, the transmit end determines to send the first TRS burst in the first slot after the uplink sending state ends.

A fourth aspect of this application provides a TRS burst transmission method. The method includes: A time axis is divided into consecutive time periods, and a transmit end determines to send a first TRS burst in a preset slot in an MCOT when determining that the preset slot in a time period is covered by the MCOT, where because a slot for sending the first TRS burst is fixed, a receive end may parse the first TRS burst in the preset slot in each time period, and the transmit end does not need to indicate, to the receive end, a slot for sending the first TRS burst, thereby reducing signaling overheads.

A fifth aspect of this application provides a TRS burst transmission apparatus. The apparatus includes:

a processing module, configured to determine to send a first TRS burst in the first slot in a first MCOT, where if a length of the first MCOT is greater than Y slots, the processing module is further configured to determine to send a second TRS burst in a slot that is in the first MCOT and whose distance to a start slot of a previous TRS burst is Y slots, where Y is an integer greater than or equal to 2; and a sending module, configured to send indication information to a receive end, where the indication information is used to indicate the slot for sending the second TRS burst.

Optionally, the processing module is further configured to determine that the slot that is in the first MCOT and whose distance to the start slot of the previous TRS burst is Y slots is not in an uplink sending state.

Optionally, the processing module is further configured to: if the processing module determines that the slot that is in the first MCOT and whose distance to the start slot of the previous TRS burst is Y slots is in the uplink sending state, determine to send the second TRS burst in the first slot after the uplink sending state ends.

Optionally, the processing module is further configured to determine that a remaining slot in the first MCOT after the uplink sending state ends is greater than or equal to a length of the TRS burst.

Optionally, the processing module is further configured to determine that a distance between an end slot in the first MCOT and a start slot of the last TRS burst of a previous MCOT is greater than Y slots.

Optionally, the processing module is specifically configured to determine to send a first TRS burst in the first complete slot in the first MCOT.

Optionally, the processing module is specifically configured to determine to send the first TRS burst in the first symbol in the first MCOT.

Optionally, the sending module is specifically configured to send the indication information to the receive end on a preset resource, where the indication information is used to indicate a slot of one TRS burst, and each piece of the indication information includes a start slot of one TRS burst.

Optionally, the sending module is specifically configured to send the indication information to the receive end on the preset resource, where the indication information is used to indicate slots of a plurality of TRS bursts, and the indication information includes a start slot of the first TRS burst and an offset between a start slot of another remaining TRS burst and the start slot of the first TRS burst.

A sixth aspect of this application provides a TRS burst transmission apparatus. The apparatus includes:

a processing module, configured to determine to send a TRS burst in the first slot that is in a first MCOT and whose distance to a start slot of a previous TRS burst is greater than or equal to Y slots, where Y is an integer greater than or equal to 2; and a sending module, configured to send indication information to a receive end, where the indication information is used to indicate the slot for sending the TRS burst.

Optionally, the processing module is further configured to determine that the first slot is not in an uplink sending state.

Optionally, the processing module is further configured to determine to send the TRS burst in the first slot after the uplink sending state ends if the first slot is in the uplink sending state.

Optionally, the processing module is further configured to determine that a remaining slot in the first MCOT after the uplink sending state ends is greater than or equal to a length of the TRS burst.

A seventh aspect of this application provides a TRS burst transmission apparatus. The apparatus includes:

a processing module, configured to determine: a first MCOT in a first time period, and send a first TRS burst in the first slot in the first time period, where the first time period includes Y slots, and Y is an integer greater than or equal to 2; and the first time period is any one of a plurality of consecutive time periods into which a time axis is divided; and a sending module, configured to send indication information to a receive end, where the indication information is used to indicate the slot for sending the first TRS burst.

Optionally, the processing module is further configured to determine that the first MCOT in the first time period is not in an uplink sending state in the first slot in the first time period.

Optionally, if the first MCOT in the first time period is in the uplink sending state in the first slot in the first time period, the processing module is further configured to determine to send the first TRS burst in the first slot after the uplink sending state ends.

An eighth aspect of this application provides a TRS burst transmission apparatus. The apparatus includes:

a processing module, configured to determine whether a preset slot in a first time period is covered by an MCOT, where if the preset slot in the first time period is covered by the MCOT, the processing module is further configured to determine to send a first TRS burst in the preset slot in the MCOT, where the first time period includes Y slots, and Y is an integer greater than or equal to 2.

A ninth aspect of this application provides a TRS burst transmission apparatus. The apparatus includes:

a processor, a memory, and a transceiver, where the memory is configured to store an instruction, the transceiver is configured to communicate with another device, and the processor is configured to execute the instruction stored in the memory, so that the TRS burst transmission apparatus performs the following method:

determining to send a first TRS burst in the first slot in a first MCOT;

if a length of the first MCOT is greater than Y slots, determining to send a second TRS burst in a slot that is in the first MCOT and whose distance to a start slot of a previous TRS burst is Y slots, where Y is an integer greater than or equal to 2; and sending indication information to a receive end, where the indication information is used to indicate the slot for sending the second TRS burst.

A tenth aspect of this application provides a TRS burst transmission apparatus. The apparatus includes:

a processor, a memory, and a transceiver, where the memory is configured to store an instruction, the transceiver is configured to communicate with another device, and the processor is configured to execute the instruction stored in the memory, so that the TRS burst transmission apparatus performs the following method:

determining to send a TRS burst in the first slot that is in a first MCOT and whose distance to a start slot of a previous TRS burst is greater than or equal to Y slots, where Y is an integer greater than or equal to 2; and sending indication information to a receive end, where the indication information is used to indicate the slot for sending the TRS burst.

An eleventh aspect of this application provides a TRS burst transmission apparatus. The apparatus includes:

a processor, a memory, and a transceiver, where the memory is configured to store an instruction, the transceiver is configured to communicate with another device, and the processor is configured to execute the instruction stored in the memory, so that the TRS burst transmission apparatus performs the following method:

determining a first MCOT in a first time period, and sending a first TRS burst in the first slot in the first time period, where the first time period includes Y slots, Y is an integer greater than or equal to 2, and the first time period is any one of a plurality of consecutive time periods into which a time axis is divided; and sending indication information to a receive end, where the indication information is used to indicate the slot for sending the first TRS burst.

A twelfth aspect of this application provides a computer-readable storage medium, applied to a TRS burst transmission apparatus, where the computer-readable storage medium stores an instruction, and when the instruction is executed by a computing apparatus, the TRS burst transmission apparatus is enabled to perform the method according to the first aspect.

A thirteen aspect of this application provides a computer-readable storage medium, applied to a TRS burst transmission apparatus, where the computer-readable storage medium stores an instruction, and when the instruction is executed by a computing apparatus, the TRS burst transmission apparatus is enabled to perform the method according to the second aspect.

A fourteenth aspect of this application provides a computer-readable storage medium, applied to a TRS burst transmission apparatus, where the computer-readable storage medium stores an instruction, and when the instruction is executed by a computing apparatus, the TRS burst transmission apparatus is enabled to perform the method according to the third aspect.

BRIEF DESCRIPTION OF DRAWINGS

FIG. 1 is a schematic flowchart of an embodiment of a TRS burst transmission method according to this application;

FIGS. 2(a)-2(c) are schematic diagrams of an example of a TRS burst transmission method according to this application;

FIGS. 4(a)-4(d) are schematic diagrams of another example of a TRS burst transmission method according to this application;

FIG. 5 is a schematic structural diagram of an MCOT according to this application;

FIG. 6 is a schematic structural diagram of another MCOT according to this application;

FIG. 8c is a schematic diagram of still another example of a TRS burst transmission method according to this application;

FIG. 8d is a schematic diagram of still another example of a TRS burst transmission method according to this application;

FIG. 9 is a schematic flowchart of still another embodiment of a TRS burst transmission method according to this application;

FIGS. 12(a)-12(e) are schematic diagrams of still another example of a TRS burst transmission method according to this application;

FIGS. 13(a)-13(e) are schematic diagrams of still another example of a TRS burst transmission method according to this application;

DESCRIPTION OF EMBODIMENTS

Figure 3:
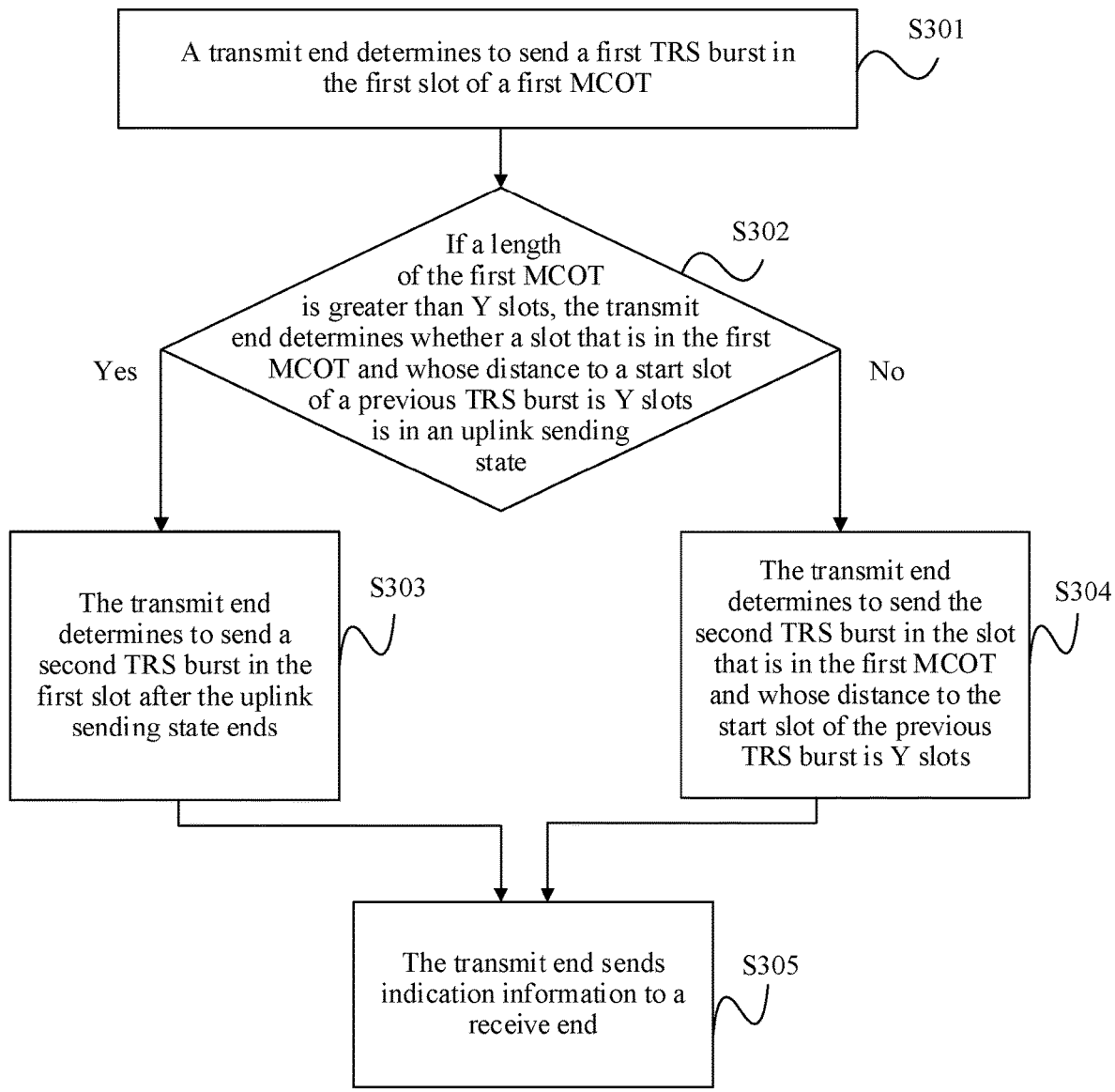
FIG. 3 is a schematic flowchart of another embodiment of a TRS burst transmission method according to this application.

In aspects of this application, in an NRU system, in a scenario in which a time of a transmit end is not synchronized with a time of a receive end, time synchronization is performed on the transmit end and the receive end by using a TRS burst, to improve reliability of receiving data by the receive end. The transmit end may be a base station, UE, or the like, and the receive end may be UE, a base station, or the like. The base station may be, for example, a NodeB in Wideband Code Division Multiple Access (WCDMA), or may be an evolved NodeB (eNB or eNodeB) in LTE. User equipment (UE) may be, for example, a mobile terminal, such as a mobile phone, a vehicle-mounted processing apparatus, or a computer with mobility. This is not limited in this application.

The following describes the technical solutions of this application by using several embodiments as examples. A same or similar concept or process may not be described in some embodiments.

The following embodiments of this application are intended for a same transmit end and a same receive end.

FIG. 1 is a schematic flowchart of an embodiment of a TRS burst transmission method according to this application. The embodiment shown in FIG. 1 is applied to a scenario in which only downlink sending is performed in a maximum channel occupancy time (MCOT). For ease of description, a first MCOT is used as an example for description, and the first MCOT is any MCOT. Execution steps of each MCOT are the same and are not described one by one, as shown in FIG. 1.

S101. A transmit end determines to send a first TRS burst in the first slot in a first MCOT.

The first TRS burst is the first TRS burst in each MCOT.

When a length of the first MCOT is less than or equal to Y slots, only one TRS burst needs to be sent in the first slot in the first MCOT, as shown in FIG. 2(*a*), and Y is an integer greater than or equal to 2. For example, a time length of the Y slots may be 5 ms, 10 ms, 20 ms, 40 ms, 80 ms, or the like. This is not limited in this application.

When the length of the first MCOT is greater than Y slots, in addition to sending a TRS burst in the first slot in the first MCOT, at least one TRS burst further needs to be sent in the first MCOT.

For ease of description, in this application, the first TRS burst sent in an MCOT is referred to as a first TRS burst, and a remaining TRS burst is referred to as a second TRS burst. A manner of determining a slot of each second TRS burst is as that described in S102.

It should be noted that, sending a TRS burst in a slot described in the embodiments of this application is sending the TRS burst starting from the slot, and the slot is a start slot of the TRS burst. One TRS burst may occupy one, two, four, or more slots. This is not limited in this application.

S102. If the length of the first MCOT is greater than Y slots, the transmit end determines to send a second TRS burst in a slot that is in the first MCOT and whose distance to a start slot of a previous TRS burst is Y slots.

As shown in FIG. 2(*b*), the second TRS burst is a TRS burst other than the first TRS burst in one MCOT. There may be one or more second TRS bursts in one MCOT. When there is a second TRS burst, a previous TRS burst of the second TRS burst refers to the first TRS burst. When there are a plurality of second TRS bursts, a previous TRS burst of the first second TRS burst in one MCOT refers to the first TRS burst, and a previous TRS burst of a remaining second TRS burst refers to a previous second TRS burst of the remaining second TRS burst. A quantity of second TRS bursts in one MCOT may be related to a length of the MCOT and a value of Y. This is not limited in this application.

S103. The transmit end sends indication information to a receive end.

The indication information is used to indicate the slot for sending the second TRS burst.

Because the transmit end fixedly sends the first TRS burst in the first slot in each MCOT, the receive end may directly parse the first TRS burst in the first slot in each MCOT. The transmit end does not need to indicate, to the receive end, the slot for sending the first TRS burst, thereby reducing signaling overheads.

In this embodiment, the transmit end determines to send the first TRS burst in the first slot in the MCOT, that is, the TRS burst is sent at a start moment of the MCOT, so that the receive end can obtain precise time-frequency synchronization as soon as possible, to facilitate decoding by the receive end and improve reliability of receiving data at the receive end. In addition, when the length of the first MCOT is greater than Y slots, in addition to sending the first TRS burst in the first slot in the MCOT, the transmit end further determines to send the second TRS burst in the slot that is in the first MCOT and whose distance to the start slot of the previous TRS burst is Y slots, to further improve effectiveness of the time-frequency synchronization and further improve the reliability of receiving the data at the receive end. Because the transmit end fixedly sends the first TRS burst in the first slot in each MCOT, the receive end may directly parse the first TRS burst in the first slot in each MCOT, and the transmit end does not need to indicate, to the receive end, the slot for sending the first TRS burst, and only needs to indicate, to the receive end, the slot for sending the second TRS, thereby reducing signaling overheads.

FIG. 3 is a schematic flowchart of another embodiment of a TRS burst transmission method according to this application. A difference between an application scenario in FIG. 3 and a scenario shown in FIG. 2 lies in that downlink sending or uplink sending may be performed in different slots in one MCOT, as shown in FIG. 3.

S301. A transmit end determines to send a first TRS burst in the first slot in a first MCOT.

For detailed descriptions of this step, refer to S101. Details are not described herein again.

S302. If a length of the first MCOT is greater than Y slots, the transmit end determines whether a slot that is in the first MCOT and whose distance to a start slot of a previous TRS burst is Y slots is in an uplink sending state.

If the slot that is in the first MCOT and whose distance to the start slot of the previous TRS burst is Y slots is in the uplink sending state, S303 is performed; or if the slot that is in the first MCOT and whose distance to the start slot of the previous TRS burst is Y slots is not in the uplink sending state, S304 is performed.

S303. The transmit end determines to send a second TRS burst in the first slot after the uplink sending state ends.

As shown in FIG. 2(c) optionally, before S303 is performed, the method may further include: determining that a remaining slot in the first MCOT after the uplink sending state ends is greater than or equal to a length of the TRS burst.

S304. The transmit end determines to send the second TRS burst in the slot that is in the first MCOT and whose distance to the start slot of the previous TRS burst is Y slots.

For detailed descriptions of this step, refer to S102. Details are not described herein again.

S305. The transmit end sends indication information to a receive end.

For detailed descriptions of this step, refer to S103. Details are not described herein again.

In this embodiment, if the slot that is in the first MCOT and whose distance to the start slot of the previous TRS burst is Y slots is in the uplink sending state, the transmit end determines to send the second TRS burst in the first slot after the uplink sending state ends, to send the TRS burst at an earliest possible moment. This improves reliability of receiving data at the receive end.

A difference between the embodiment of still another TRS burst transmission method according to this application and the embodiment shown in FIG. 1 or FIG. 3 lies in that: in the embodiment shown in FIG. 1 or FIG. 3, a first TRS burst is sent in the first slot in each MCOT; however, in this embodiment, as shown in FIG. 4(a), when a distance between an end slot in an MCOT and a start slot of the last TRS burst of a previous MCOT is less than or equal to Y slots, a first TRS is not sent, or when the end slot in the first MCOT is greater than the start slot of the last TRS burst of the previous MCOT, a manner of determining, by the transmit end, the slot for sending the first TRS burst or the slot for sending the second TRS burst is the same as that in the embodiment shown in FIG. 1 or FIG. 3, as shown in FIGS. 4(b)-4(d). Details are not described herein again.

In this embodiment, when the end slot in the MCOT is less than or equal to the start slot of the last TRS burst of the previous MCOT, the first TRS is not sent. When the distance between the end slot in the MCOT and the start slot of the last TRS burst of the previous MCOT is greater than Y slots, the slot for sending the first TRS burst or the slot for sending the second TRS burst is determined based on the embodiment shown in FIG. 1 or FIG. 3. Therefore, a quantity of times of sending the TRS burst is reduced, and overheads of sending the TRS burst are reduced.

Each slot includes 14 symbols. In one case, the first symbol of one MCOT is also the first symbol of one slot, that is, a start moment boundary of the MCOT is aligned with a start moment boundary of the slot, as shown in FIG. 5. In the other case, the first symbol of one MCOT is different from the first symbol of one slot, that is, a start moment boundary of the MCOT is not aligned with a start moment boundary of the slot, as shown in FIG. 6.

Figure 7:
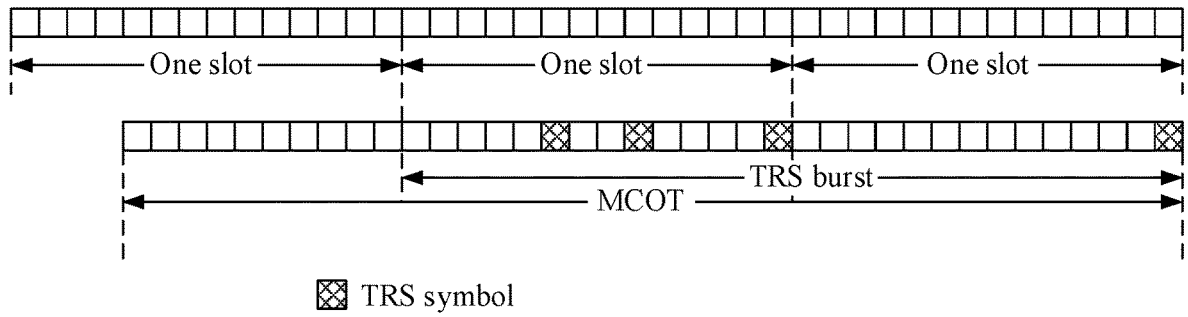
FIG. 7 is a schematic diagram of still another example of a TRS burst transmission method according to this application.

For a scenario shown in FIG. 6, in a possible implementation, with reference to the foregoing embodiments, sending a first TRS burst in the first slot in a first MCOT is sending the first TRS burst in the first complete slot in the first MCOT, as shown in FIG. 7.

Figure 8A:
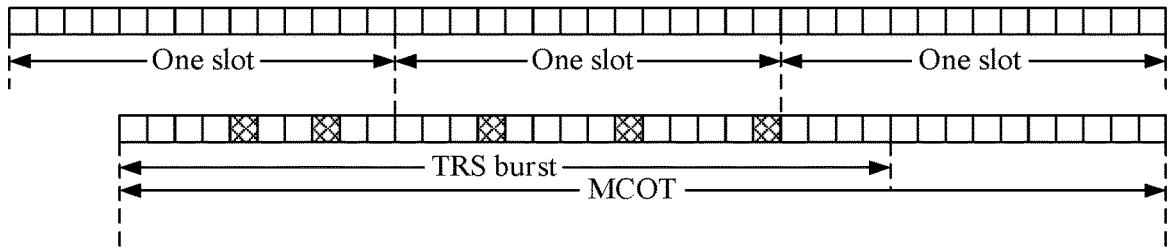
FIG. 8a is a schematic diagram of still another example of a TRS burst transmission method according to this application.

For the scenario shown in FIG. 6, in another possible implementation, in the foregoing embodiments, sending the first TRS burst in the first slot in the first MCOT is sending the first TRS burst in the first symbol in the first MCOT, and the first TRS burst is a complete TRS burst. Assuming that the complete TRS burst occupies X slots, a length of the first TRS burst is X slots. As shown in FIG. 8a. X=2 is used as an example.

Figure 8B:
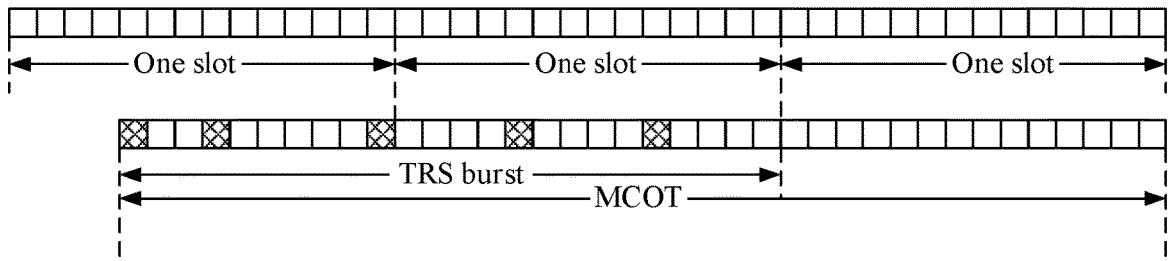
FIG. 8b is a schematic diagram of still another example of a TRS burst transmission method according to this application.

For the scenario shown in FIG. 6, in still another possible implementation, with reference to the foregoing embodiments, sending the first TRS burst in the first slot in the first MCOT is sending the first TRS burst in the first symbol in the first MCOT, and the first TRS burst is an incomplete TRS burst. Assuming that the complete TRS burst occupies X slots, the length of the first TRS burst is a sum of (X−1) slots and symbols occupied by the first incomplete slot, as shown in FIG. 8b. X=2 is used as an example in FIG. 8b.

For the scenario shown in FIG. 6, in yet another possible implementation, with reference to the foregoing embodiments, when the symbols occupied by the first incomplete slot in the first MCOT are greater than or equal to seven symbols, the first TRS burst is sent in the first slot in the first MCOT, sending the first TRS burst in the first complete half-slot in the first MCOT. In one case, the first TRS burst is a complete TRS burst. Assuming that the complete TRS burst occupies X slots, the length of the first TRS burst is X slots, as shown in FIG. 8c. X=2 is used as an example in FIG. 8c. In the other case, the first TRS burst is an incomplete TRS burst. Assuming that the complete TRS burst occupies X slots, the length of the first TRS burst is (X−0.5) slots, as shown in FIG. 8d. X=2 is used as an example in FIG. 8d.

For a solution of sending an incomplete TRS burst, a location of each TRS symbol in the incomplete TRS burst and a location of each TRS symbol in a complete TRS burst are aligned with an end location of the TRS burst, as shown in FIG. 8b or FIG. 8d.

FIG. 9 is a schematic flowchart of still another embodiment of a TRS burst transmission method according to this application. The embodiment shown in FIG. 9 is applied to a scenario in which only downlink sending is performed in one MCOT. As shown in FIG. 9.

S901. A transmit end determines to send a TRS burst in the first slot that is in a first MCOT and whose distance to a start slot of a previous TRS burst is greater than or equal to Y slots.

The previous TRS burst may be one of a plurality of TRS bursts in the first MCOT, or may be the last TRS burst in a previous MCOT. This is determined based on an actual application scenario. This is not limited in this application.

Figure 10:
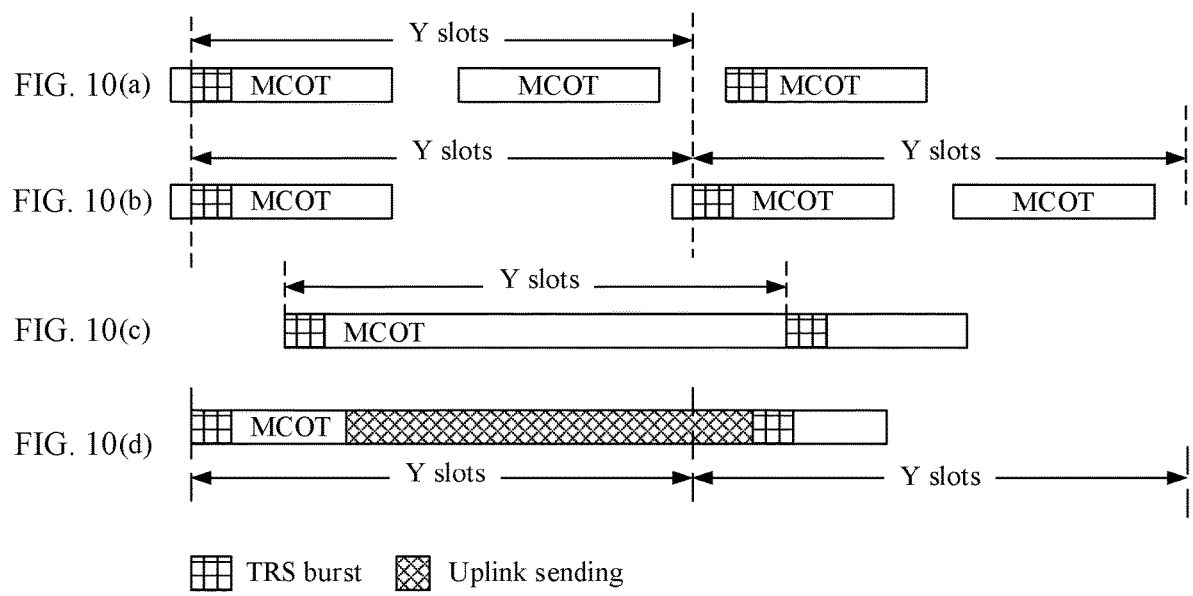
FIGS. 10(a)-10(d) are schematic diagrams of still another example of a TRS burst transmission method according to this application.

As shown in FIGS. 10(a)-10(b),

S902. The transmit end sends indication information to a receive end.

The indication information is used to indicate the slot for sending the TRS burst.

In this embodiment, the transmit end determines to send the TRS burst in the first slot that is in the first MCOT and whose distance to the start slot of the previous TRS burst is greater than or equal to Y slots, to reduce a quantity of times of sending the TRS burst, and reduce overheads for sending the TRS burst.

Figure 11:
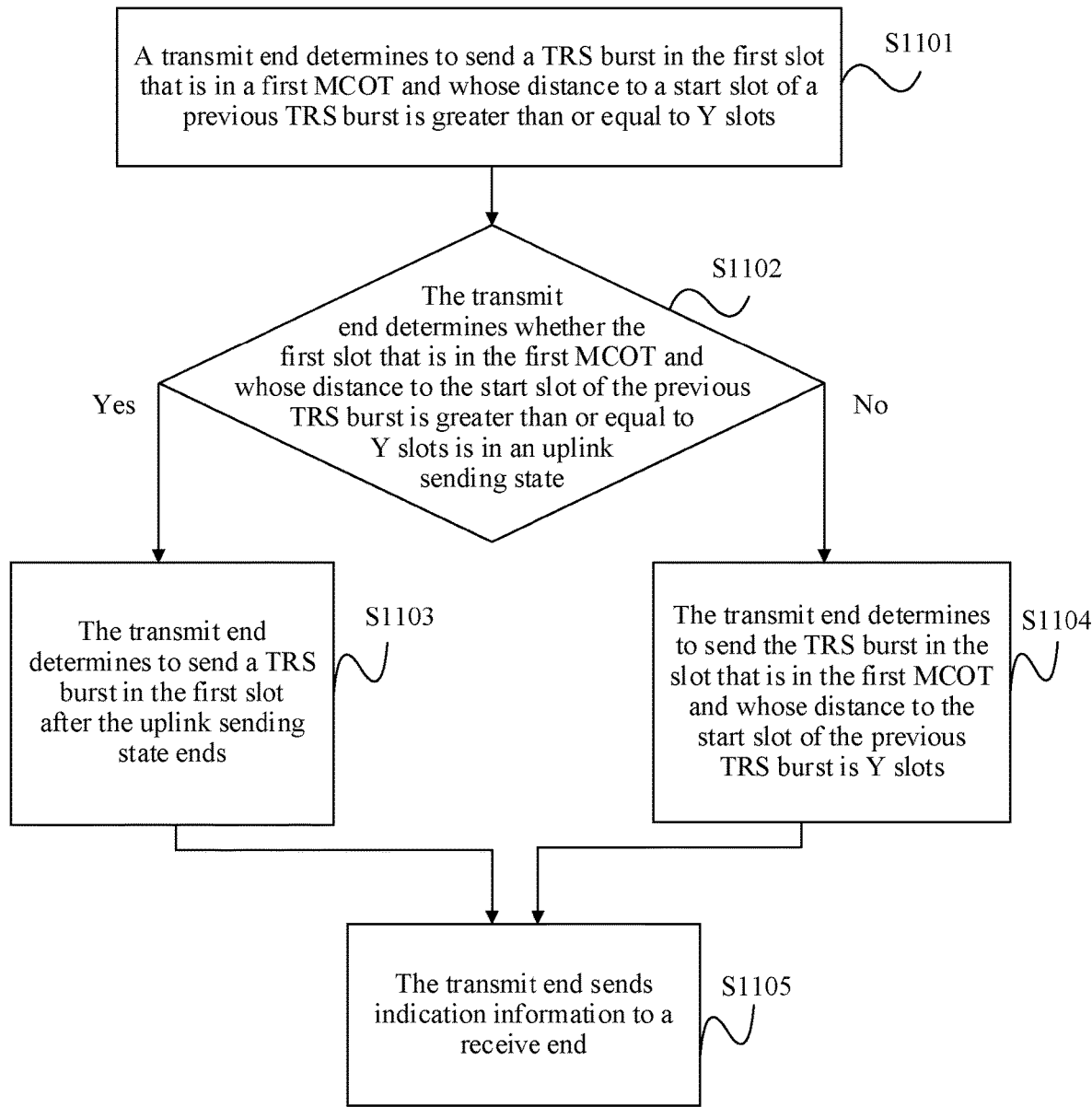
FIG. 11 is a schematic flowchart of still another embodiment of a TRS burst transmission method according to this application.

FIG. 11 is a schematic flowchart of a TRS burst transmission method according to still another embodiment of this application. A difference between the embodiment shown in FIG. 11 and the embodiment shown in FIG. 9 lies in that the embodiment shown in FIG. 11 is applied to a scenario in which downlink sending or uplink sending may be performed in different slots in one MCOT, as shown in FIG. 11.

S1101. A transmit end determines to send a TRS burst in the first slot that is in a first MCOT and whose distance to a start slot of a previous TRS burst is greater than or equal to Y slots.

For detailed descriptions of this step, refer to S901. Details are not described herein again.

S1102. The transmit end determines whether the first slot that is in the first MCOT and whose distance to the start slot of the previous TRS burst is greater than or equal to Y slots is in an uplink sending state.

If the first slot that is in the first MCOT and whose distance to the start slot of the previous TRS burst is greater than or equal to Y slots is in the uplink sending state, S1103 is performed; or if the first slot that is in the first MCOT and whose distance to the start slot of the previous TRS burst is greater than or equal to Y slots is not in the uplink sending state, S1104 is performed.

S1103. The transmit end determines to send a TRS burst in the first slot after the uplink sending state ends.

As shown in FIGS. 10(c)-10(d), optionally, before S1103 is performed, the method may further include: determining that a remaining slot in the first MCOT after the uplink sending state ends is greater than or equal to a length of the TRS burst.

S1104. The transmit end determines to send the TRS burst in the slot that is in the first MCOT and whose distance to the start slot of the previous TRS burst is Y slots.

S1105. The transmit end sends indication information to a receive end.

For detailed descriptions of this step, refer to S902. Details are not described herein again.

In this embodiment, the transmit end determines to send the TRS burst in the first slot that is in the first MCOT and whose distance to the start slot of the previous TRS burst is greater than or equal to Y slots, to reduce a quantity of times of sending the TRS burst, and reduce overheads for sending the TRS burst. When the first slot that is in the first MCOT and whose distance to the start slot of the previous TRS burst is greater than or equal to Y slots is not in an uplink sending state, the transmit end determines to send the TRS burst in a slot that is in the first MCOT and whose distance to the start slot of the previous TRS burst is Y slots, to improve reliability of receiving data by the receive end. If the first slot that is in the first MCOT and whose distance to the start slot of the previous TRS burst is greater than or equal to Y slots is in the uplink sending state, it is determined that the TRS burst is sent in the first slot after the uplink sending state ends, to send the TRS burst at the earliest possible moment. This further improves reliability of receiving data by the receive end.

According to still another embodiment of a TRS burst transmission method provided in this application, a time axis is divided into consecutive time periods, and each time period includes Y slots. A transmit end sends a first TRS burst in the first slot in a first MCOT in each time period, as shown in FIGS. 12(a)-12(d). If the first slot in the first MCOT in a first time period is in an uplink sending state, the transmit end determines to send a first TRS in the first slot after the uplink sending state ends, as shown in (e) in FIG. 12.

It should be noted that if the first MCOT in a time period is in the uplink sending state in the time period, the TRS is sent in the time period.

In this embodiment, the time axis is divided into consecutive time periods, and the first TRS burst is sent in the first slot in the first MCOT in each time period, so that the TRS burst is sent at the earliest possible moment in each time period, thereby improving reliability of receiving data by a receive end.

According to another embodiment of a TRS burst transmission method provided in this application, a time axis is divided into consecutive time periods, and each time period includes Y slots. When a transmit end determines that a preset slot in one time period is covered by an MCOT, the transmit end determines to send a first TRS burst in the preset slot in the MCOT, as shown in FIGS. 13(a)-13(d).

It should be noted that, if the preset slot in the time period is covered by the MCOT, but the preset slot is in an uplink sending state, the first TRS burst is not sent in the time period, as shown in (e) in FIG. 13.

The preset slot in each time period may be the first slot, or may be another slot, provided that the preset slot in each time period is the same. This is not limited in this application.

In this embodiment, the time axis is divided into consecutive time periods, and the transmit end determines to send the first TRS burst in the preset slot in the MCOT when determining that the preset slot in the time period is covered by the MCOT. Because a slot for sending the first TRS burst is fixed, a receive end may parse the first TRS burst in the preset slot in each time period, and the transmit end does not need to indicate, to the receive end, the slot for sending the first TRS burst, thereby reducing signaling overheads.

Figure 14:
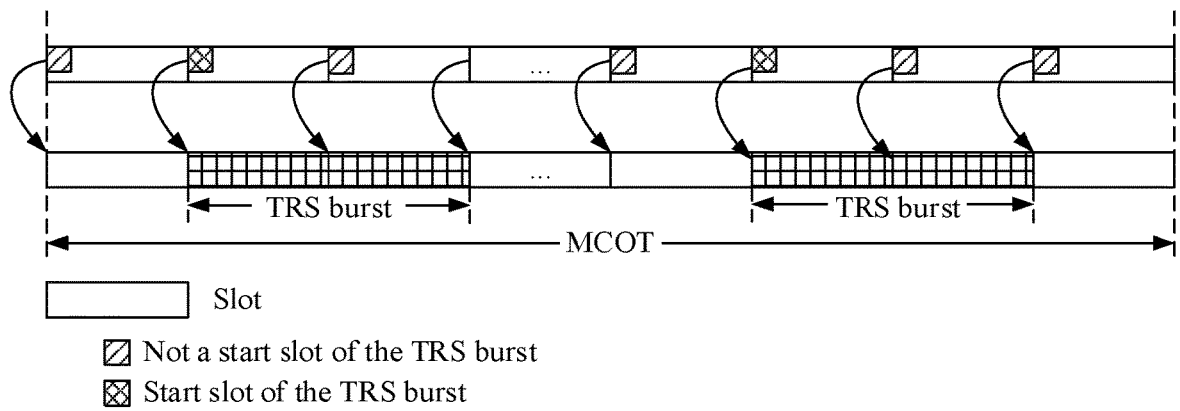
FIG. 14 is a schematic diagram of a type of indication information of a TRS burst transmission method according to this application.

In the foregoing embodiments, a manner in which the transmit end sends the indication information to the receive end includes but is not limited to the following possible implementations:

In a possible implementation, indication information is transmitted on a specified resource, and each piece of indication information is used to indicate a start slot of a TRS burst. For example, downlink control information (DCI) is carried on a group common physical downlink control channel (group common PDCCH). The DCI is used to indicate whether a slot is a start slot of a TRS burst, as shown in FIG. 14. Alternatively, transmission is performed by using UE-specific DCI, transmission is performed by using radio resource control (RRC), and so on. This is not limited in this application.

Figure 15:
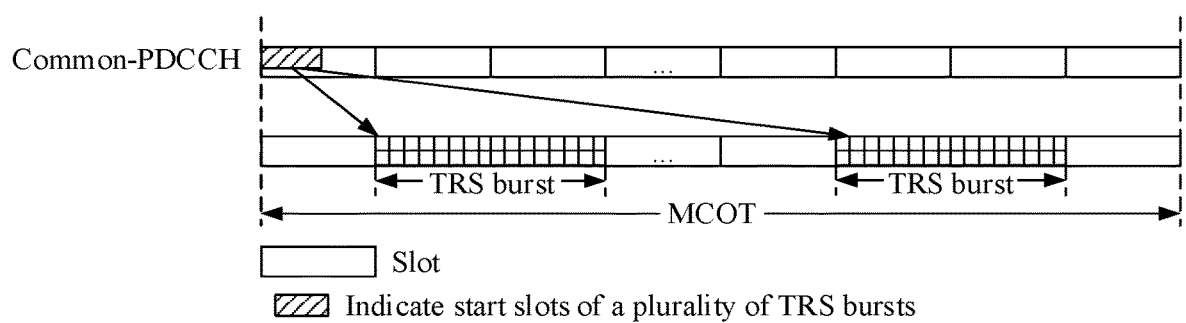
FIG. 15 is a schematic diagram of another type of indication information of a TRS burst transmission method according to this application.

In another possible implementation, indication information is transmitted on a specified resource, and one piece of indication information is used to indicate start slots of a plurality of TRS bursts. For example, the indication information may include a start slot of a first TRS burst, and a time offset between a start slot of another remaining TRS burst and the start slot of the first TRS burst, as shown in FIG. 15.

In still another possible implementation, information about a start slot of a TRS burst is scrambled by using a specific scrambling code, to indicate that the slot is the start slot of the TRS burst.

In still another possible implementation, scrambling is performed on a DMRS signal in a start slot of a TRS burst, to indicate that the slot is the start slot of the TRS burst.

Figure 16:
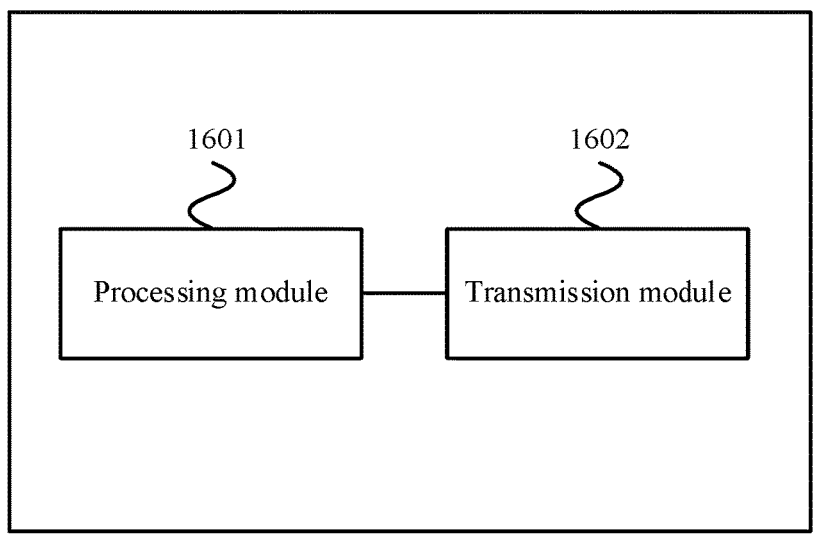
FIG. 16 is a schematic structural diagram of an embodiment of a TRS burst transmission apparatus according to this application.

FIG. 16 is a schematic structural diagram of an embodiment of a TRS burst transmission apparatus according to this application. The apparatus in this embodiment includes a processing module 1601 and a sending module 1602. The processing module 1601 is configured to determine to send a first TRS burst in the first slot in a first MCOT. If a length of the first MCOT is greater than Y slots, the processing module 1601 is further configured to determine to send a second TRS burst in a slot that is in the first MCOT and whose distance to a start slot of a previous TRS burst is Y slots, and Y is an integer greater than or equal to 2. The sending module 1602 is configured to send indication information to a receive end, and the indication information is used to indicate the slot for sending the second TRS burst.

Optionally, the processing module 1601 is further configured to determine that the slot that is in the first MCOT and whose distance to the start slot of the previous TRS burst is Y slots is not in an uplink sending state.

Optionally, the processing module 1601 is further configured to: if the processing module determines that the slot that is in the first MCOT and whose distance to the start slot of the previous TRS burst is Y slots is in the uplink sending state, determine to send the second TRS burst in the first slot after the uplink sending state ends.

Optionally, the processing module 1601 is further configured to determine that a remaining slot in the first MCOT after the uplink sending state ends is greater than or equal to a length of the TRS burst.

Optionally, the processing module 1601 is further configured to determine that a distance between an end slot in the first MCOT and a start slot of the last TRS burst of a previous MCOT is greater than Y slots.

Optionally, the processing module 1601 is specifically configured to determine to send a first TRS burst in the first complete slot in the first MCOT.

Optionally, the processing module 1601 is specifically configured to determine to send the first TRS burst in the first symbol in the first MCOT.

Optionally, the sending module 1602 is specifically configured to send the indication information to the receive end on a preset resource, where the indication information is used to indicate a slot of one TRS burst, and each piece of the indication information includes a start slot of one TRS burst.

Optionally, the sending module 1602 is specifically configured to send the indication information to the receive end on the preset resource, where the indication information is used to indicate slots of a plurality of TRS bursts, and the indication information includes a start slot of the first TRS burst and an offset between a start slot of another remaining TRS burst and the start slot of the first TRS burst.

The apparatus in this embodiment may be correspondingly configured to execute the technical solutions of the method embodiment shown in FIG. 1 or FIG. 3. The implementation principles and technical effects are similar, and details are not described herein again.

Figure 17:
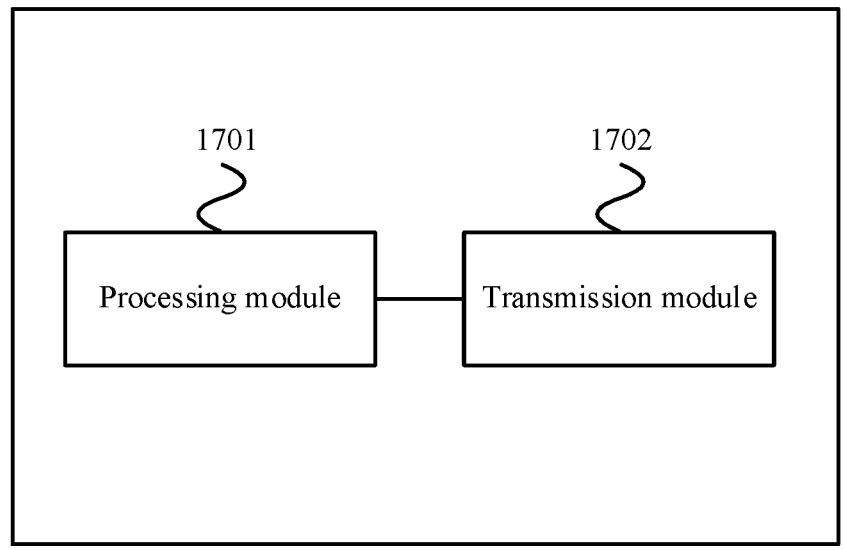
FIG. 17 is a schematic structural diagram of another embodiment of a TRS burst transmission apparatus according to this application.

FIG. 17 is a schematic structural diagram of an embodiment of another TRS burst transmission apparatus according to this application. The apparatus in this embodiment includes a processing module 1701 and a sending module 1702. The processing module 1701 is configured to determine to send a TRS burst in the first slot that is in a first MCOT and whose distance to a start slot of a previous TRS burst is greater than or equal to Y slots, and Y is an integer greater than or equal to 2.

The sending module 1702 is configured to send indication information to a receive end, and the indication information is used to indicate the slot for sending the TRS burst.

Optionally, the processing module 1701 is further configured to determine that the first slot is not in an uplink sending state.

Optionally, the processing module 1701 is further configured to determine to send the TRS burst in the first slot after the uplink sending state ends if the first slot is in the uplink sending state.

Optionally, the processing module 1701 is further configured to determine that a remaining slot in the first MCOT after the uplink sending state ends is greater than or equal to a length of the TRS burst.

The apparatus in this embodiment may be correspondingly configured to execute the technical solutions of the method embodiment shown in FIG. 9 or FIG. 11. The implementation principles and technical effects are similar, and details are not described herein again.

Figure 18:
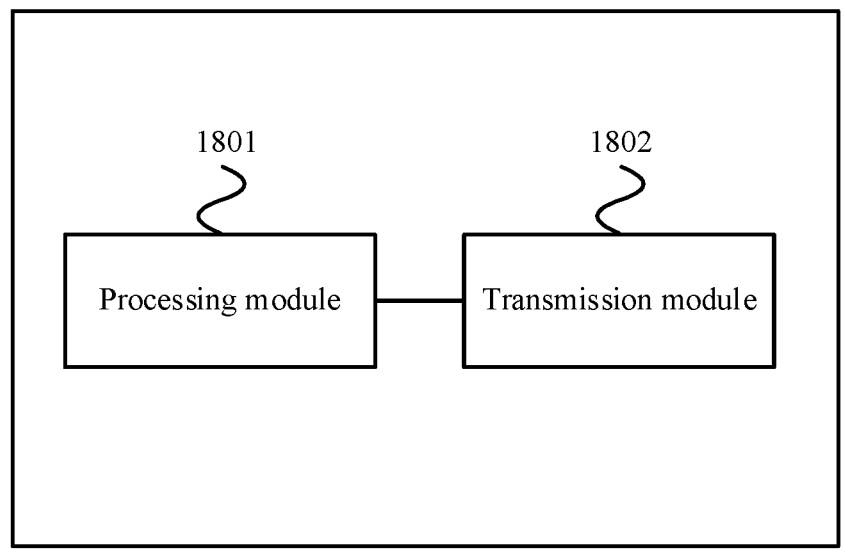
FIG. 18 is a schematic structural diagram of still another embodiment of a TRS burst transmission apparatus according to this application.

FIG. 18 is a schematic structural diagram of still another embodiment of a TRS burst transmission apparatus according to this application. The apparatus in this embodiment includes a processing module 1801 and a sending module 1802. The processing module 1801 is configured to determine: the first MCOT in a first time period, and send a first TRS burst in the first slot in the first time period. The first time period includes Y slots, and Y is an integer greater than or equal to 2. The first time period is any one of a plurality of consecutive time periods into which a time axis is divided. The sending module 1802 is configured to send indication information to a receive end, and the indication information is used to indicate the slot for sending the first TRS burst.

Optionally, the processing module 1801 is further configured to determine that the first MCOT in the first time period is not in an uplink sending state in the first slot in the first time period.

Optionally, if the first MCOT in the first time period is in the uplink sending state in the first slot in the first time period, the processing module 1801 is further configured to determine to send the first TRS burst in the first slot after the uplink sending state ends.

This application further provides an embodiment of a TRS burst transmission apparatus. The apparatus in this embodiment includes a processing module, configured to determine whether a preset slot in a first time period is covered by an MCOT. If the preset slot in the first time period is covered by the MCOT, the processing module is further configured to determine to send a first TRS burst in the preset slot in the MCOT, where the first time period includes Y slots, and Y is an integer greater than or equal to 2.

Figure 19:
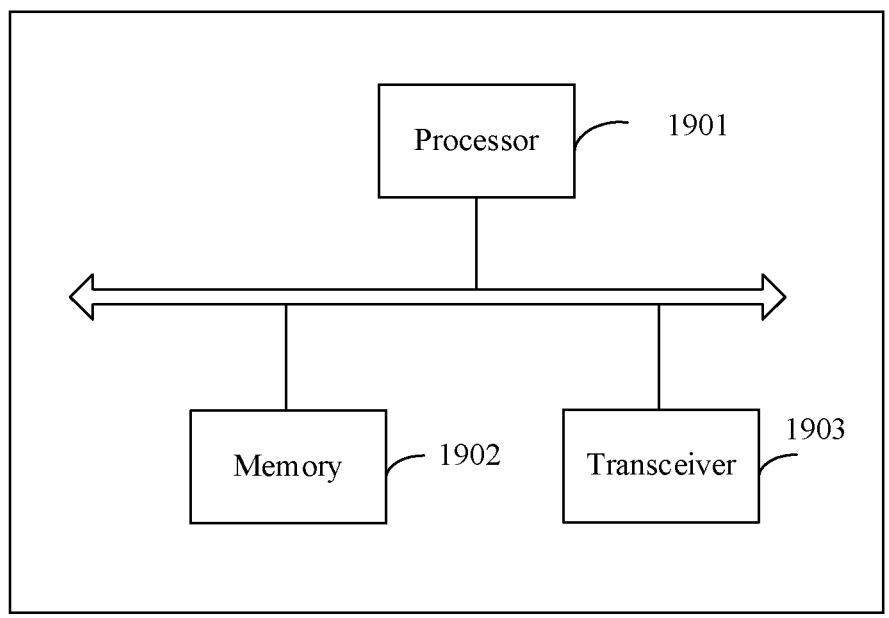
FIG. 19 is a schematic structural diagram of still another embodiment of a TRS burst transmission apparatus according to this application.

FIG. 19 is a structural diagram of still another embodiment of a TRS burst transmission apparatus according to this application. The apparatus includes:

a processor 1901, a memory 1902, and a transceiver 1903, where the memory 1902 is configured to store an instruction, the transceiver 1903 is configured to communicate with another device, and the processor 1901 is configured to execute the instruction stored in the memory 1902, so that the TRS burst transmission apparatus performs the following method:

determining to send a first TRS burst in the first slot in a first MCOT;

if a length of the first MCOT is greater than Y slots, determining to send a second TRS burst in a slot that is in the first MCOT and whose distance to a start slot of a previous TRS burst is Y slots, where Y is an integer greater than or equal to 2; and sending indication information to a receive end, where the indication information is used to indicate the slot for sending the second TRS burst.

Figure 20:
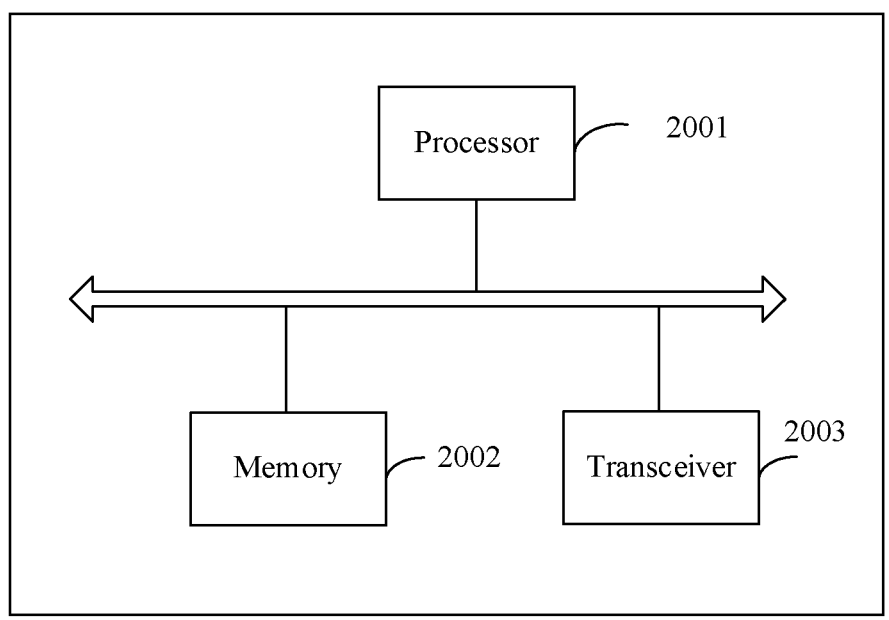
FIG. 20 is a schematic structural diagram of still another embodiment of a TRS burst transmission apparatus according to this application.

FIG. 20 is a structural diagram of still another embodiment of a TRS burst transmission apparatus according to this application. The apparatus includes:

a processor 2001, a memory 2002, and a transceiver 2003, where the memory 2002 is configured to store an instruction, the transceiver 2003 is configured to communicate with another device, and the processor 2001 is configured to execute the instruction stored in the memory 2002, so that the TRS burst transmission apparatus performs the following method:

determining to send a TRS burst in the first slot that is in a first MCOT and whose distance to a start slot of a previous TRS burst is greater than or equal to Y slots, where Y is an integer greater than or equal to 2; and sending indication information to a receive end, where the indication information is used to indicate the slot for sending the TRS burst.

Figure 21:
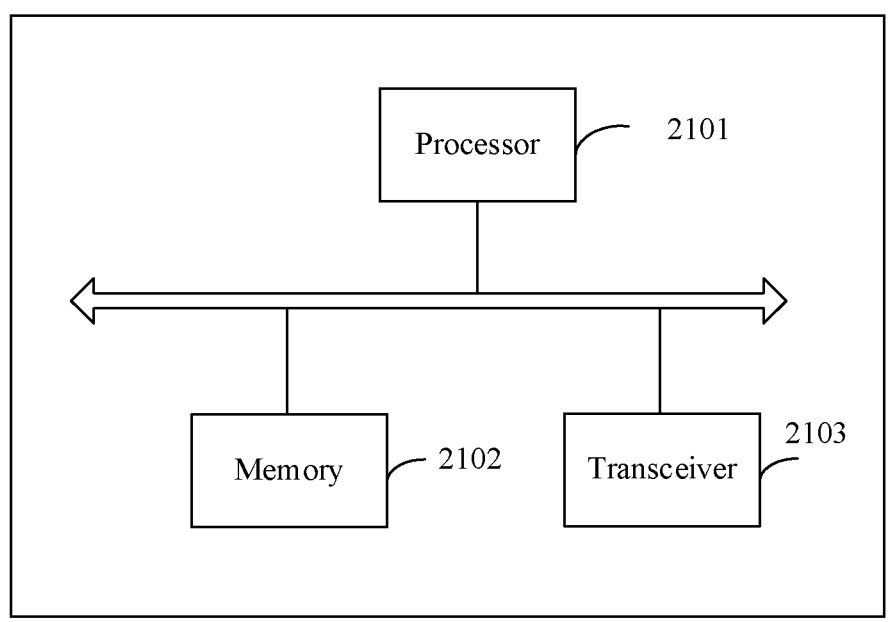
FIG. 21 is a schematic structural diagram of still another embodiment of a TRS burst transmission apparatus according to this application.

FIG. 21 is a structural diagram of still another embodiment of a TRS burst transmission apparatus according to this application. The apparatus includes:

a processor 2101, a memory 2102, and a transceiver 2103, where the memory 2102 is configured to store an instruction, the transceiver 2103 is configured to communicate with another device, and the processor 2101 is configured to execute the instruction stored in the memory 2102, so that the TRS burst transmission apparatus performs the following method:

determining a first MCOT in a first time period, and sending a first TRS burst in the first slot in the first time period, where the first time period includes Y slots, Y is an integer greater than or equal to 2, and the first time period is any one of a plurality of consecutive time periods into which a time axis is divided; and sending indication information to a receive end, where the indication information is used to indicate the slot for sending the first TRS burst.

Aspects of this application further provide a computer-readable storage medium, applied to a TRS burst transmission apparatus. The computer-readable storage medium stores an instruction, and when the instruction is executed by a computing apparatus, the TRS burst transmission apparatus is enabled to perform the method shown in FIG. 1 or FIG. 3.

Aspects of this application further provide a computer-readable storage medium, applied to a TRS burst transmission apparatus. The computer-readable storage medium stores an instruction, and when the instruction is executed by a computing apparatus, the TRS burst transmission apparatus is enabled to perform the method shown in FIG. 9 or FIG. 11.

Aspects of this application further provide a computer-readable storage medium, applied to a TRS burst transmission apparatus. The computer-readable storage medium stores an instruction, and when the instruction is executed by a computing apparatus, the TRS burst transmission apparatus is enabled to perform the method shown in FIG. 12.

It may be understood that the processor used in the base station or the user equipment in this application may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination that implements a computing function, for example, a combination of one or more microprocessors, or a combination of a DSP and a microprocessor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

What is claimed is:

1. A tracking reference signal (TRS) burst transmission method comprising:
   determining, by a transmit end, to send a first TRS burst in a first slot in a first maximum channel occupancy time (MCOT);
   if a length of the first MCOT is greater than Y slots, determining, by the transmit end, to send a second TRS burst in a slot that is in the first MCOT and whose distance to a start slot of the first TRS burst is Y slots, wherein Y is an integer greater than or equal to 2;
   if a distance between an end slot in the first MCOT and a start slot of a last TRS burst of a previous MCOT is less than or equal to the Y slots, the first TRS burst is not sent, and determining, by the transmit end, to send the second TRS burst in the slot that is in next MCOT and whose distance to the start slot of the last TRS burst of the previous MCOT is greater than the Y slots; and
   sending, by the transmit end, indication information to a receive end, wherein the indication information is used to indicate the slot for sending the second TRS burst.

2. The method according to claim 1, wherein before the determining, by the transmit end, to send the second TRS burst in the slot that is in the first MCOT and whose distance to the start slot of the first TRS burst is the Y slots, the method further comprises:
- determining, by the transmit end, that the slot that is in the first MCOT and whose distance to the start slot of the first TRS burst is the Y slots is not in an uplink sending state.

3. The method according to claim 2, further comprising:
- if the transmit end determines that the slot that is in the first MCOT and whose distance to the start slot of the first TRS burst is the Y slots is in the uplink sending state, determining to send the second TRS burst in a first slot after the uplink sending state ends.

4. The method according to claim 3, wherein before the determining to send the second TRS burst in the first slot after the uplink sending state ends, the method further comprises:
- determining, by the transmit end, that a remaining slot in the first MCOT after the uplink sending state ends is greater than or equal to a length of the second TRS burst.

5. The method according to claim 3, wherein before determining to send the second TRS burst, determining that a remaining slot in the first MCOT after the uplink sending state ends is greater than or equal to a length of the second TRS burst.

6. The method according to claim 1, wherein before the determining, by the transmit end, to send the first TRS burst in the first slot in the first MCOT, the method further comprises:
- determining, by the transmit end, that a distance between an end slot in the first MCOT and a start slot of the last TRS burst of a previous MCOT is greater than Y slots.

7. The method according to claim 1, wherein the first TRS burst is sent in a first symbol in the first MCOT, and the first TRS burst is a complete TRS burst.

8. The method according to claim 1, wherein the first TRS burst is sent in a first symbol in the first MCOT, and the first TRS burst is an incomplete TRS burst.

9. The method according to claim 1, wherein a start moment boundary of the first MCOT is not aligned with a start moment boundary of the first slot.

10. The method according to claim 1, wherein only downlink sending is performed in the first MCOT.

11. The method according to claim 1, wherein downlink sending and uplink sending is performed in different slots in the first MCOT.

12. The method according to claim 1, further comprising scrambling a demodulation reference signal (DMRS) signal in a start slot of the first TRS burst.

13. A tracking reference signal (TRS) burst transmission method, comprising:
- determining, by a transmit end, to send a second TRS burst in a first slot that is in a first maximum channel occupancy time (MCOT) and whose distance to a start slot of a previous tracking reference signal (TRS) burst is greater than or equal to Y slots, wherein Y is an integer greater than or equal to 2;
- if a length of the first MCOT is greater than the Y slots, a first TRS burst is sent in another slot in the first MCOT at distance greater than or equal to the Y slots;
- if a distance between an end slot in a previous MCOT and a start slot of the previous TRS burst is less than or equal to the Y slots, determining not to send the first TRS burst in the previous MCOT; and
- sending, by the transmit end, indication information to a receive end, wherein the indication information is used to indicate the first slot for sending the second TRS burst.

14. The method according to claim 13, wherein before the determining, by the transmit end, to send the second TRS burst in the first slot that is in the first MCOT and whose distance to the start slot of the previous TRS burst is greater than or equal to the Y slots, the method further comprises:
- determining, by the transmit end, that the first slot is not in an uplink sending state.

15. The method according to claim 14, further comprising:
- if the first slot is in the uplink sending state, determining, by the transmit end, to send the second TRS burst in a first slot after the uplink sending state ends.

16. The method according to claim 15, wherein before the determining to send the second TRS burst in the first slot after the uplink sending state ends, the method further comprises:
- determining, by the transmit end, that a remaining slot in the first MCOT after the uplink sending state ends is greater than or equal to a length of the second TRS burst.

17. A tracking reference signal (TRS) burst transmission apparatus, comprising:
- a memory configured to store an instruction;
- a transceiver configured to communicate with another device and a processor configured to execute the instruction stored in the memory, so as to:
- determine to send a first TRS burst in a first slot of a first maximum channel occupancy time (MCOT);
- if a length of the first MCOT is greater than Y slots, determine to send a second TRS burst in a slot that is in the first MCOT and whose distance to a start slot of the first TRS burst is Y slots, wherein Y is an integer greater than or equal to 2;
- if a distance between an end slot in the first MCOT and a start slot of a last TRS burst of a previous MCOT is less than or equal to the Y slots, the first TRS burst is not sent, and determine to send the second TRS burst in the slot that is in next MCOT and whose distance to the start slot of the last TRS burst of the previous MCOT is greater than the Y slots; and
- sending indication information to a receive end, wherein the indication information is used to indicate the first slot for sending the second TRS burst.

18. A tracking reference signal (TRS) burst transmission apparatus, comprising:
- a memory configured to store an instruction;
- a transceiver configured to communicate with another device; and
- a processor configured to execute the instruction stored in the memory, so as to:
- determine to send a second TRS burst in a first slot that is in a first maximum channel occupancy time (MCOT) and whose distance to a start slot of a previous TRS burst is greater than or equal to Y slots, wherein Y is an integer greater than or equal to 2;
- if a length of the first MCOT is greater than the Y slots, a first TRS burst is sent in another slot in the first MCOT at distance greater than or equal to the Y slots;
- if a distance between an end slot in a previous MCOT and a start slot of the previous TRS burst is less than or equal to the Y slots, determine not to send the first TRS burst in the previous MCOT; and sending indication information to a receive end, wherein the indication information is used to indicate the first slot for sending the second TRS burst.

19. A tracking reference signal (TRS) burst transmission apparatus, comprising:
   a memory configured to store an instruction;
   a transceiver configured to communicate with another device; and
   a processor configured to execute the instruction stored in the memory, so as to:
   determine a first maximum channel occupancy time (MCOT) in a first time period, and send a first TRS burst in a first slot in the first time period, wherein the first time period comprises Y slots, Y is an integer greater than or equal to 2, and the first time period is any one of a plurality of consecutive time periods into which a time axis is divided;
   if a distance between an end slot in the first MCOT and a start slot of a last TRS burst of a previous MCOT is less than or equal to the Y slots, the first TRS burst is not sent, and determine to send a second TRS burst in a slot that is in next MCOT and whose distance to the start slot of the last TRS burst of the previous MCOT is greater than the Y slots; and
   sending indication information to a receive end, wherein the indication information is used to indicate the first slot for sending the first TRS burst.

20. The apparatus according to claim 19, wherein when a transmit end determines that a preset slot in one time period is covered by the first MCOT, the transmit end determines to send the first TRS burst in the preset slot in the first MCOT to the receive end.

* * * * *